(12) United States Patent
Pang et al.

(10) Patent No.: US 11,169,109 B2
(45) Date of Patent: Nov. 9, 2021

(54) ELECTROCHEMICAL DETECTION CHIP AND DETECTION METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Fengchun Pang, Beijing (CN); Peizhi Cai, Beijing (CN); Yue Geng, Beijing (CN); Le Gu, Beijing (CN); Chuncheng Che, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 390 days.

(21) Appl. No.: 16/235,455

(22) Filed: Dec. 28, 2018

(65) Prior Publication Data
US 2019/0204262 A1 Jul. 4, 2019

(30) Foreign Application Priority Data
Jan. 2, 2018 (CN) .......................... 201810001886.X

(51) Int. Cl.
*G01N 27/27* (2006.01)
*G01N 27/403* (2006.01)
*B01L 3/00* (2006.01)

(52) U.S. Cl.
CPC ...... *G01N 27/403* (2013.01); *B01L 3/502792* (2013.01); *G01N 27/27* (2013.01)

(58) Field of Classification Search
CPC ..................... B01L 3/502784; B01L 3/502792
See application file for complete search history.

(56) References Cited

U.S. PATENT DOCUMENTS 8,808,519 B2 * 8/2014 Trubey .............. B01L 3/502792
204/600
9,188,615 B2 * 11/2015 Sturmer ............... G01N 27/048
(Continued)

FOREIGN PATENT DOCUMENTS

| CN | 1912625 A | 2/2007 |
| CN | 102095770 A | 6/2011 |

(Continued)

OTHER PUBLICATIONS

First Office Action issued in corresponding Chinese Patent Application No. 201810001886.X, dated Sep. 20, 2019, with English language translation.

*Primary Examiner* — Alexander S Noguerola
(74) *Attorney, Agent, or Firm* — McDermott Will and Emery LLP

(57) ABSTRACT

An electrochemical detection chip includes a first substrate and a second substrate opposite to each other, a plurality of driving electrodes, first detection electrodes and second detection electrodes. The plurality of driving electrodes are arranged on a side of the first substrate facing toward the second substrate and are arranged independently. The first detection electrodes and the second detection electrodes are arranged at a plurality of positions on a side of the second substrate facing toward the first substrate that are directly opposite at least a part of the plurality of driving electrodes, and are spaced apart from each other.

15 Claims, 7 Drawing Sheets

(56) References Cited

U.S. PATENT DOCUMENTS

2016/0231268 A1 8/2016 Pamula et al.
2017/0315090 A1* 11/2017 Wheeler .......... G01N 27/44791
2019/0329259 A1* 10/2019 Wu ................... B01L 3/502792

FOREIGN PATENT DOCUMENTS

| CN | 102175744 A | 9/2011 |
| CN | 102861623 A | 1/2013 |
| CN | 103170384 A | 6/2013 |
| CN | 103412024 A | 11/2013 |
| CN | 206281759 U | 6/2017 |
| CN | 107110816 A | 8/2017 |
| CN | 107118955 A | 9/2017 |

* cited by examiner

ELECTROCHEMICAL DETECTION CHIP AND DETECTION METHOD THEREOF

CROSS-REFERENCE TO RELATED APPLICATION

This application claims priority to Chinese Patent Application No. 201810001886.X, filed on Jan. 2, 2018, titled "AN ELECTROCHEMICAL DETECTION CHIP AND DETECTION METHOD THEREOF", which is incorporated herein by reference in its entirety.

TECHNICAL FIELD

The present disclosure relates to the field of electrochemical detection based on the digital microfluidic technology, and more particularly, to an electrochemical detection chip and a detection method thereof.

BACKGROUND

Electrochemical detection technology is a commonly used biological detection technology, and is widely used in point-of-care (POC) diagnosis, pharmaceutical and life science research, analytic detection, industrial detection, drug discovery, etc. The principle of the electrochemical detection technology is to apply external voltages to a working electrode and a counter electrode when a liquid to be tested and an analytical reagent react on the working electrode and the counter electrode, and then detect a change of current during that the liquid to be tested and the analytical reagent react, thereby determine whether there is a corresponding target analyte in the liquid to be tested.

SUMMARY

In a first aspect of the present disclosure, an electrochemical detection chip is provided. The electrochemical detection chip includes a first substrate and a second substrate that are opposite to each other, a plurality of driving electrodes, first detection electrodes and second detection electrodes. The plurality of driving electrodes are arranged on a side of the first substrate facing toward the second substrate, and are arranged independently. The first detection electrodes and the second detection electrodes are arranged at a plurality of positions on a side of the second substrate facing toward the first substrate that are directly opposite at least a part of the plurality of driving electrodes, and are spaced apart from each other.

In some embodiments, the plurality of driving electrodes include a plurality of first driving electrodes and a plurality of second driving electrodes. Each first driving electrode is configured to be directly opposite a corresponding first detection electrode and a corresponding second detection electrode. Positions of the second substrate that are directly opposite the plurality of second driving electrode are not provided with a first detection electrode and a second detection electrode. The plurality of second driving electrodes are arranged in at least one row along a row direction, and the plurality of first driving electrodes are arranged in at least one row along the row direction. At least one row of first driving electrodes is correspondingly disposed on at least one side of each row of second driving electrodes along a column direction, and first driving electrodes in each row of first driving electrodes are aligned with second driving electrodes in a corresponding row of second driving electrodes in the column direction in a one-to-one corresponding manner.

In some embodiments, the electrochemical detection chip further includes at least one liquid storage electrode disposed on the first substrate, and each of the at least one liquid storage electrode is located near a beginning or end of a corresponding row of second driving electrodes.

In some embodiments, an area of one of the at least one single liquid storage electrode is greater than an area of one of the plurality of single driving electrodes.

In some embodiments, the electrochemical detection chip further includes a first signal wiring layer and a first dielectric layer. The first signal wiring layer is disposed on the first substrate. The first dielectric layer is disposed between the first signal wiring layer and the plurality of driving electrodes. The first signal wiring layer includes a plurality of wires, and the plurality of wires are electrically connected with the plurality of driving electrodes through via holes formed in the first dielectric layer.

In some embodiments, the electrochemical detection chip further includes a first hydrophobic layer disposed on a side of the plurality of driving electrodes and the at least one liquid storage electrode facing away from the first substrate, and covers the plurality of driving electrodes and the at least one liquid storage electrode.

In some embodiments, the plurality of wires include at least one first signal wire, a plurality of second signal wires, and at least one third signal wire. The at least one first signal wire is configured to be electrically connected to at least one row of first driving electrodes respectively. The plurality of second signal wires are configured to be electrically connected to second driving electrodes in a row respectively. The at least one third signal wire is configured to be electrically connected to at least one column of liquid storage electrodes respectively.

In some embodiments, the electrochemical detection chip further includes a plurality of bonding electrodes disposed on the first substrate, and the plurality of bonding electrodes are configured to bond a circuit board. Each first signal wire, each second signal wire and each third signal wire are connected to corresponding bonding electrodes respectively.

In some embodiments, the electrochemical detection chip further includes a second hydrophobic layer disposed on a side of the second substrate facing toward the first substrate, and an area occupied by the second hydrophobic layer on the second substrate is directly opposite an area of the first hydrophobic layer that covers the second driving electrodes.

In some embodiments, the electrochemical detection chip further includes at least one drip hole passing through the second substrate, to respectively expose at least one area of the first hydrophobic layer that covers the at least one liquid storage electrode.

In some embodiments, patterns of each first detection electrode and a corresponding second detection electrode are both comb-shaped, and comb tooth parts of the first detection electrode and comb tooth parts of the second detection electrode are arranged alternatively and are spaced apart from each other.

In some embodiments, the electrochemical detection chip further includes a second signal wiring layer disposed on the second substrate. Wires of the second signal wiring layer are configured to be electrically connected to the first detection electrodes and the second detection electrodes.

In some embodiments, the wires of the second signal wiring layer include at least one fourth signal wire and a plurality of fifth signal wires. The at least one fourth signal wire is configured to be electrically connected to at least one row of first detection electrodes respectively, and the plurality of fifth signal wires are configured to be electrically connected to the second detection electrodes respectively.

In some embodiments, the electrochemical detection chip further includes a plurality of second bonding electrodes, at least one fourth signal wire connecting line, and a plurality of fifth signal wire connecting lines, which are all disposed on the first substrate. The plurality of second bonding electrodes are configured to bond a circuit board. Each fourth signal wire connecting line and each fifth signal wire connecting line are configured to be connected to corresponding second bonding electrodes respectively. The electrochemical detection chip further includes electrical connection structures arranged between the first substrate and the second substrate. The electrical connection structures are configured to electrically connect the at least one fourth signal wire with the at least one fourth signal wire connecting line in a one-to-one correspondence manner, and electrically connect the plurality of fifth signal wires with the plurality of fifth signal wire connecting lines in a one-to-one correspondence manner.

In some embodiments, the electrical connection structures are conductive adhesives.

In some embodiments, the electrochemical detection chip further includes a support disposed between the first substrate and the second substrate.

In a second aspect of the present disclosure, a detection method of the electrochemical detection chip is provided, and the detection method includes: applying driving signals to at least some of the plurality of driving electrodes respectively, such that a droplet of the liquid to be tested and a droplet of the analytical reagent move to a detection position; and applying detection signals to one of the first detection electrodes and one of the second detection electrodes at the detection position respectively to detect whether there is a current change before and after the droplet of the liquid to be tested contacts the droplet of the analytical reagent.

BRIEF DESCRIPTION OF THE DRAWINGS

The accompanying drawings described herein are used to provide further understanding of the present disclosure and constitute a part of the present disclosure. The exemplary embodiments in the present disclosure and the descriptions thereof serve to explain the present disclosure, but do not constitute an improper limitation to the present disclosure. In the accompanying drawings.

DETAILED DESCRIPTION

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

It is noted that unless otherwise defined, all terms (including technical and scientific terms) used in embodiments of the present disclosure have meanings the same as commonly understood by a person of ordinary skill in the art. It shall also be understood that terms, e.g. those defined in typical dictionaries shall be construed as having the same meanings as the meanings in the context of related art, and shall not be construed in an ideal or extremely formalized sense, unless otherwise explicitly defined herein.

For example, terms "first" and "second" used in the description and claims of the present disclosure and similar terms do not indicate any sequence, quantity or importance, but only to distinguish the components. Term "include" or "comprise" and other similar terms mean that the element or article that precedes this word covers the listed element or article and the equivalents thereof that succeed this word, but does not exclude other elements or articles. The directions or positional relations indicated by the terms such as "above/upper", "below/lower", "row/row direction", and "column/column direction" are directions or positional relations as illustrated in the accompanying drawings, and they are merely a simplified description for describing the technical solution of the present disclosure, but not for indicating or hinting that the indicated device or element must be placed in a certain direction, or constructed or operated in a specific direction. Therefore, said directions or positional relations cannot be understood as a limitation to the present disclosure. For example, in some circumstances, embodiments relating to "row direction" can be implemented in the circumstance of "column direction", and vice versa. The solution of the present disclosure that is subjected to a 90° rotation or imaging is still within the scope of the patent right of the present disclosure.

In the related art, 96-hole plates are usually adopted for the electrochemical detection chip, i.e., there are 96 holes in the detection chip as detection sites. The analyte is dripped into the 96 holes, which takes a long time. Moreover, since a drop of analyte dripped in each hole has a certain volume, each detection chip requires a large amount of total droplets, which causes a large waste of the reagents.

Figure 1:
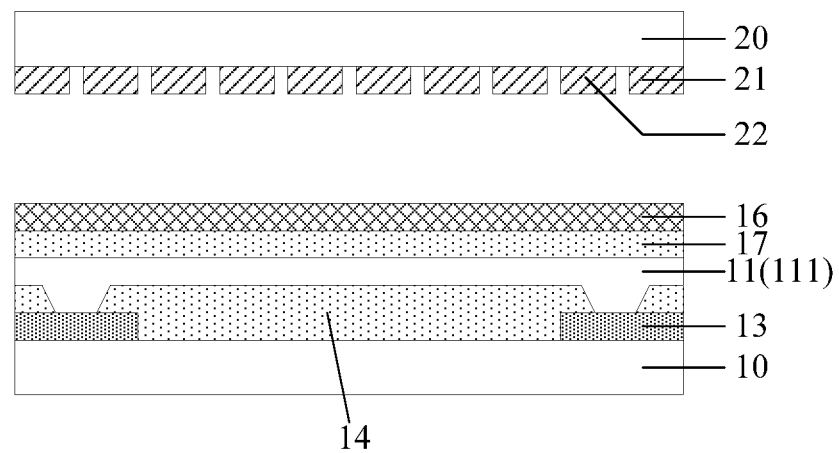
FIG. 1 is a schematic structural diagram of a section of a electrochemical detection chip according to some embodiments of the present disclosure.

With regard to the above problem, as shown in FIG. 1, some embodiments of the present disclosure provide an electrochemical detection chip, and the electrochemical detection ship includes a first substrate 10, a second substrate 20, a plurality of independent driving electrodes 11, first detection electrodes 21 and second detection electrodes 22. The first substrate 10 and the second substrate 20 are opposite to each other. The plurality of independent driving electrodes 11 are arranged on a side of the first substrate 10 facing toward the second substrate 20. The first detection electrodes 21 and the second detection electrodes 22 are respectively arranged at a plurality of positions on a side of the second substrate 20 facing toward the first substrate 10 that are directly opposite at least a part of the driving electrodes 11, and are spaced apart from each other.

It is noted that the above "opposite to each other" means that the two substrates are disposed in a face-to-face manner to form a space, such that droplets can move and mix in the space. On this basis, the detection is performed. The above "independent" means that the plurality of driving electrodes 11 are spaced apart from each other.

The above description that "a first detection electrode 21 and a second detection electrode 22 are respectively arranged at a plurality of positions on a side of the second substrate 20 facing toward the first substrate 10 that are directly opposite at least a part of the driving electrodes 11" means that a pair of first detection electrode 21 and second detection electrode 22 are respectively arranged on a plurality of positions on a side of the second substrate 20 facing toward the first substrate 10 that are directly opposite partial or all the driving electrodes 11.

In this way, if driving signals (such as voltage signals) are applied sequentially to the plurality of driving electrodes 11, a transverse electric field from one driving electrode 11 to an adjacent driving electrode 11 can be formed, such that dipole moments of polar molecules in a liquid with a polar structure are deformed, at least one small droplet is separated from the liquid, and the at least one small droplet is driven to move to at least one driving electrode 11 at at least one detection position respectively. At the same time, each of the at least one small droplet is in contact with a first detection electrode 21 and a second detection electrode 22 on the second substrate 20 that are directly opposite the driving electrode 11 where the small droplet is located. According to this operation, multiple driving electrodes 11 can drive a droplet of the liquid to be tested and a droplet of the analytical reagent to move to a same driving electrode 11 along a same or two different paths, so as to mix the droplet of the analytical reagent and the droplet of the liquid to be tested, and make the droplet of the liquid to be tested in contact with the first detection electrode 21 and the second detection electrode 22 on the second substrate 20 that are directly opposite the driving electrode 11 before and after they are mixed with the droplet of the analytical reagent. Then, by applying detection signals to the first detection electrode 21 and the second detection electrode 22, current changes before and after the mixing of the droplet of the analytical reagent and the droplet of the liquid to be tested can be detected. Thereby, whether a target analyte exists in the liquid to be tested can be detected.

If a target analyte is contained in the liquid to be tested, a corresponding electrochemical reaction may occur between the droplet of the analytical reagent and the droplet of the liquid to be tested. By applying detection signals (such as detection voltages) to the first detection electrode 21 and the second detection electrode 22, a difference between currents detected before and after the droplet of the analytical reagent and the droplet of the liquid to be tested contact may be obtained. Thereby, whether a target analyte exists in the liquid to be tested may be detected. The detection principle in the prior art can be used, and it is not limited herein.

The above detection technology is the digital microfluidics technology based on the dielectric wetting principle. It can control discrete droplets, consumes fewer reagents, saves costs, has no cross-contamination, and can control the droplets separately. It is easy to form an integrated portable system, and thus basic operation units such as sample preparation, reaction, separation and detection in biological, chemical and medical analysis processes may be integrated into a chip of micron scale to automatically complete the entire process of analysis.

On this basis, in the electrochemical detection chip provided in the embodiments of the present disclosure, driving signals are applied to the driving electrodes to control the droplets separated and moving to a corresponding detection position for detection. This saves the drip time. Besides, the reagent dripped each time can be separated into multiple small droplets to move to corresponding detection positions, and it is unnecessary to drip certain amount of reagent to each of the detection sites. Therefore, the volume of the droplets required is merely at a level of microlitre. Thus, fewer reagents are consumed, and the detection cost is reduced.

Figure 2:
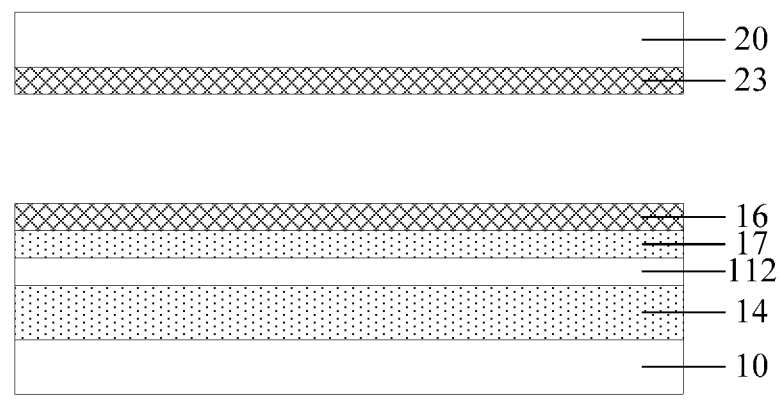
FIG. 2 is a schematic structural diagram of a section of another electrochemical detection chip according to some embodiments of the present disclosure.
Figure 5:
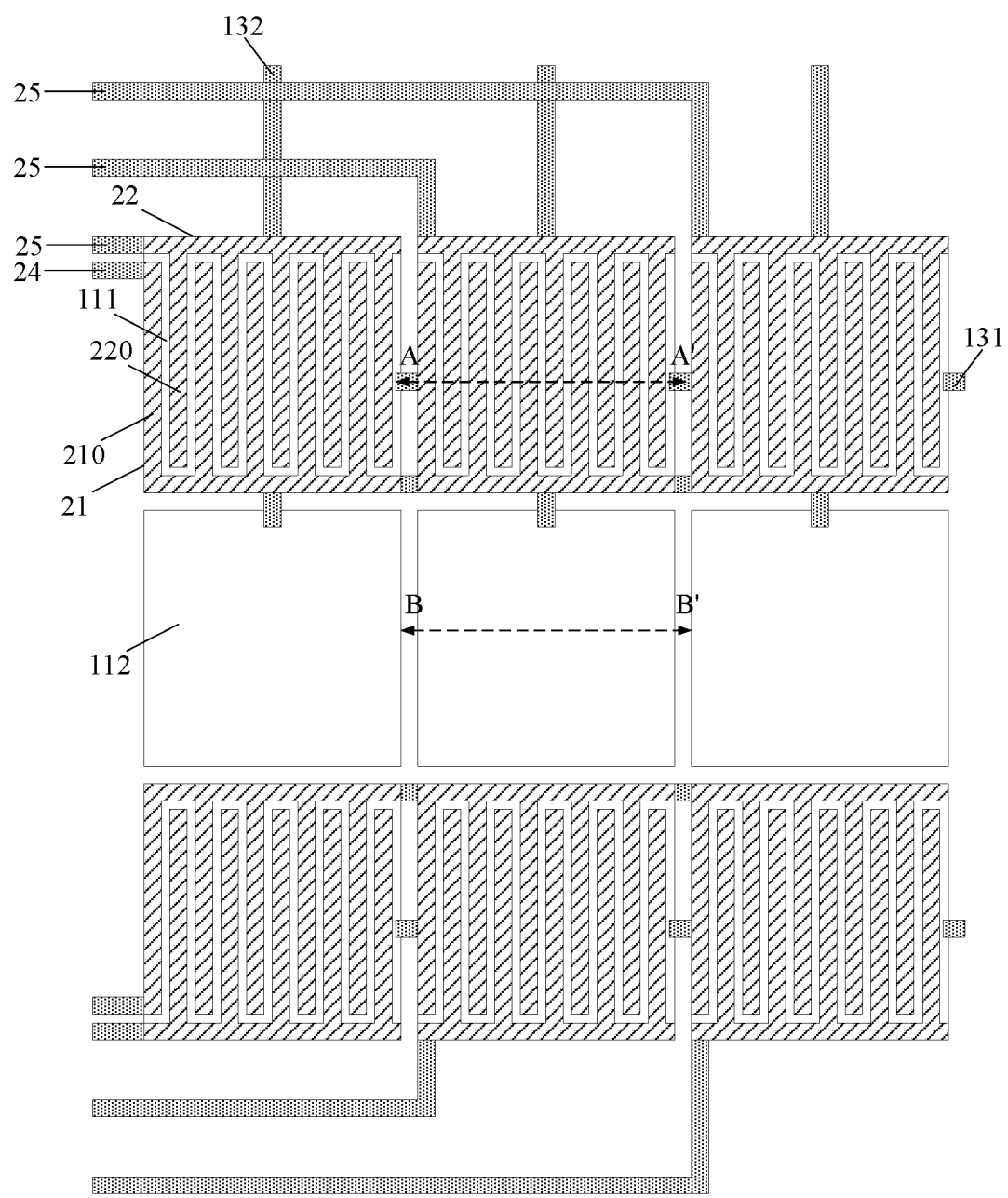
FIG. 5 is a schematic diagram illustrating a partial structure obtained after a first substrate in an electrochemical detection chip is assembled with a second substrate therein according to some embodiments of the present disclosure, wherein sectional structures in directions A-A' and B-B' are shown respectively in FIGS. 1 and 2.

In some embodiments, as shown in FIGS. 1, 2 and 5, the plurality of driving electrodes 11 include a plurality of first driving electrodes 111 and a plurality of second driving electrodes 112. Each first driving electrode 111 is configured to be directly opposite a corresponding first detection electrode 21 and a corresponding second detection electrode 22. As shown in FIG. 2, positions of the second substrate 20 that are directly opposite the second driving electrodes 112 are not provided with a first detection electrode 21 and a second detection electrode 22.

Figure 3:
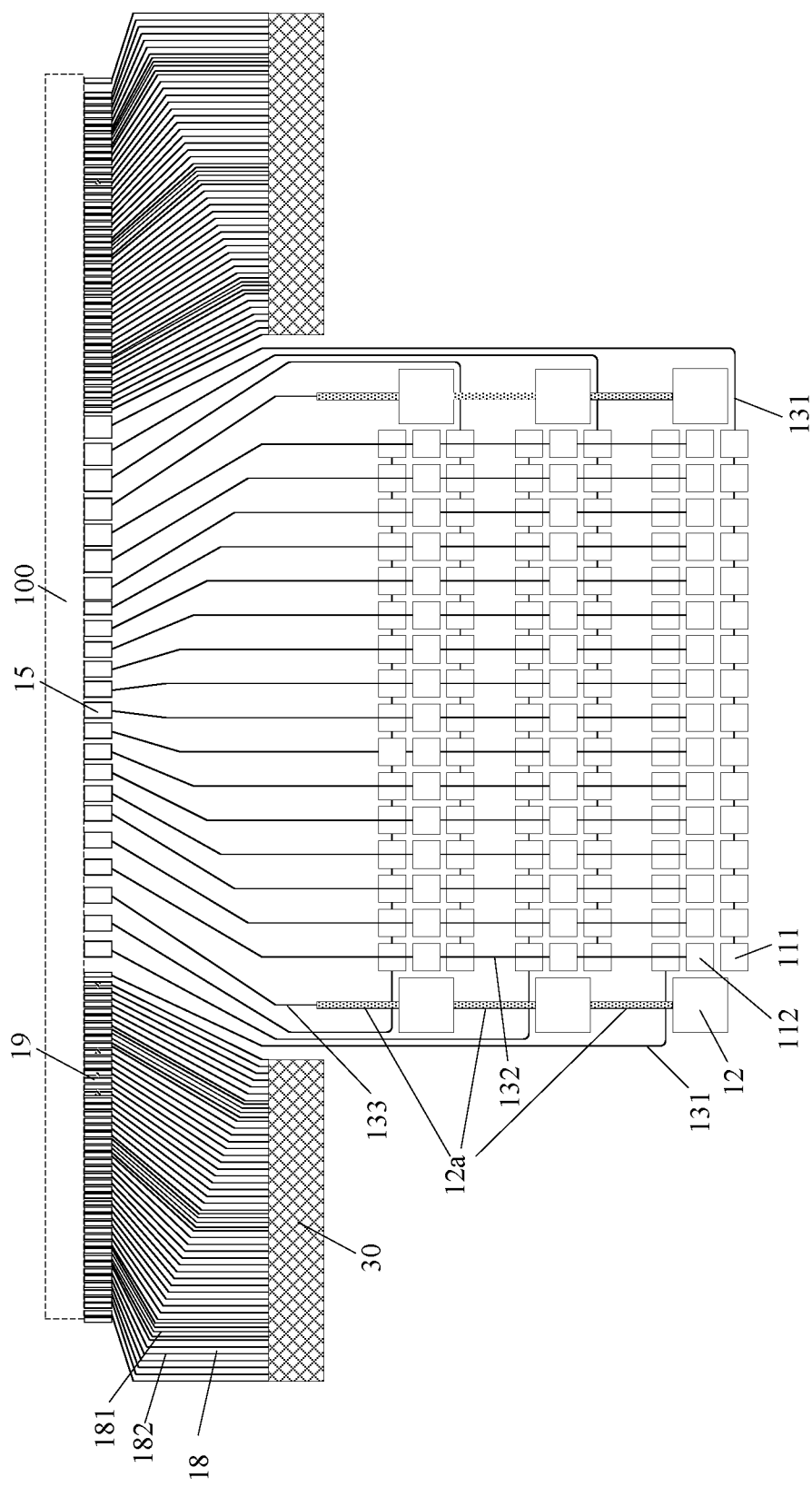
FIG. 3 is a schematic diagram illustrating structures on a first substrate in an electrochemical detection chip according to some embodiments of the present disclosure.

In some embodiments, as shown in FIG. 3, the arrangement of the plurality of driving electrodes is as follows. The plurality of second driving electrodes 112 are arranged in at least one row along a row direction, and the plurality of first driving electrodes 111 are arranged in at least one row along the row direction. At least one row of the first driving electrodes 111 is correspondingly disposed on at least one side of each row of the second driving electrodes 112 along a column direction, and first driving electrodes 111 in each row of the first driving electrodes 111 are aligned with second driving electrodes 112 in a corresponding row of the second driving electrodes 112 in the column direction in a one-to-one correspondence manner. It is noted that the above row direction is perpendicular to the column direction, presenting an angle of 90°.

FIG. 3 only shows examples in which the second driving electrodes 112 are arranged in three rows in the row direction. Similarly, FIG. 3 also only shows examples in which each of both sides of each row of second driving electrodes 112 in the column direction is provided with a row of first driving electrodes 111. The numbers and/or arrangement of the first driving electrodes 111 and the second driving electrodes 112 may be flexibly set according to the detection requirement (i.e., detection sites) required by the electrochemical detection chip, which is not limited herein.

In some embodiments, the electrochemical detection chip further includes at least one liquid storage electrode 12 disposed on the first substrate 10, and the at least one liquid storage electrode 12 each is located near the beginning or end of a corresponding row of the second driving electrodes 112.

The description that "the at least one liquid storage electrode 12 each is located near the beginning or end of each row of the second driving electrodes 112" means that a liquid storage electrode 12 is, for example, only disposed on one side of a row of second driving electrodes 112, i.e., the beginning or end of the row of second driving electrodes 112 along the row direction, or two liquid storage electrodes 12 are respectively disposed on both sides of a row of second driving electrodes 112 along the row direction, i.e., the beginning and the end of the row of second driving electrodes 112 each is provided with one of the above liquid storage electrodes 12. For example, each row of the second driving electrodes 112 is provided with a liquid storage electrode 12 near its beginning or end. Alternatively, each row of the second driving electrodes 112 is provided with liquid storage electrodes 12 respectively near its beginning and end.

Taking one of the at least one liquid storage electrode 12 as an example, after the reagent is dripped into an area where the liquid storage electrode 12 is located, driving signals can be firstly applied sequentially to a row of second driving electrodes 112 corresponding to the liquid storage electrode 12, such that a small droplet of the reagent is separated from the reagent on the liquid storage electrode 12, and the small droplet is driven to move to any second driving electrode 112 of this row of second driving electrodes 112. Then a driving signal is applied to first driving electrodes 111 at one or two sides of this second driving electrode 112 that are aligned with this second driving electrode 112 in the column direction, i.e., the small droplet can be driven to move to one of areas where the above-described first driving electrodes 111 are located. Since each first driving electrode 111 is configured to be directly opposite the first detection electrode 21 and the second detection electrode 22 on the second substrate, corresponding detection signals can be applied to the first detection electrode 21 and the second detection electrode 22 to detect the droplet that moves to this position.

Here, to facilitate synchronous movement of the small droplet of the liquid to be tested and the small droplet of the analytical reagent, so as to improve the detection efficiency, in some embodiments, the at least one liquid storage electrode 12 includes at least two liquid storage electrodes, and two liquid storage electrodes 12 thereof are respectively located on both sides of a row of second driving electrodes 112 along the row direction, such that the liquid to be tested and the analytical reagent can be placed separately. Besides, multiple reactions between the liquid to be tested and the analytical reagent are needed to determine whether a target analyte exists in the liquid to be tested, and disposing the liquid storage electrodes 12 on both sides of a row of second driving electrodes 112 is also advantageous to the multiple reactions between the small droplet of the liquid to be tested and the small droplet of the analytical reagent, so as to expand the application scope of the electrochemical detection chip in the embodiments of the present disclosure.

Each liquid storage electrode 12 functions as a "liquid storage pool" that stores liquid. Therefore, in some embodiments, as shown in FIG. 3, an area of a single liquid storage electrode 12 is configured to be greater than an area of a single driving electrode 11. For example, an area of each of the at least one liquid storage electrode 12 is configured to be greater than an area of each of the plurality of driving electrodes 11. The "driving electrode 11" here refers to the first driving electrode 111 or the second driving electrode 112.

In some embodiments, sizes of the liquid storage electrode 12 and the driving electrode 11 are as follows. A length of a side of the liquid storage electrode 12 is in a range of 1 mm to 10 mm, a length of a side of the driving electrode 11 is in a range of 0.1 mm to 3 mm, and a distance between the driving electrode 11 and a liquid storage electrode 12 at the beginning and/or end of a row, and a distance between two adjacent driving electrodes 11 are both in a range of 10 μm to 100 μm. The liquid storage electrode 12 and the driving electrode 11 are both in, for example, a square shape.

Figure 4:
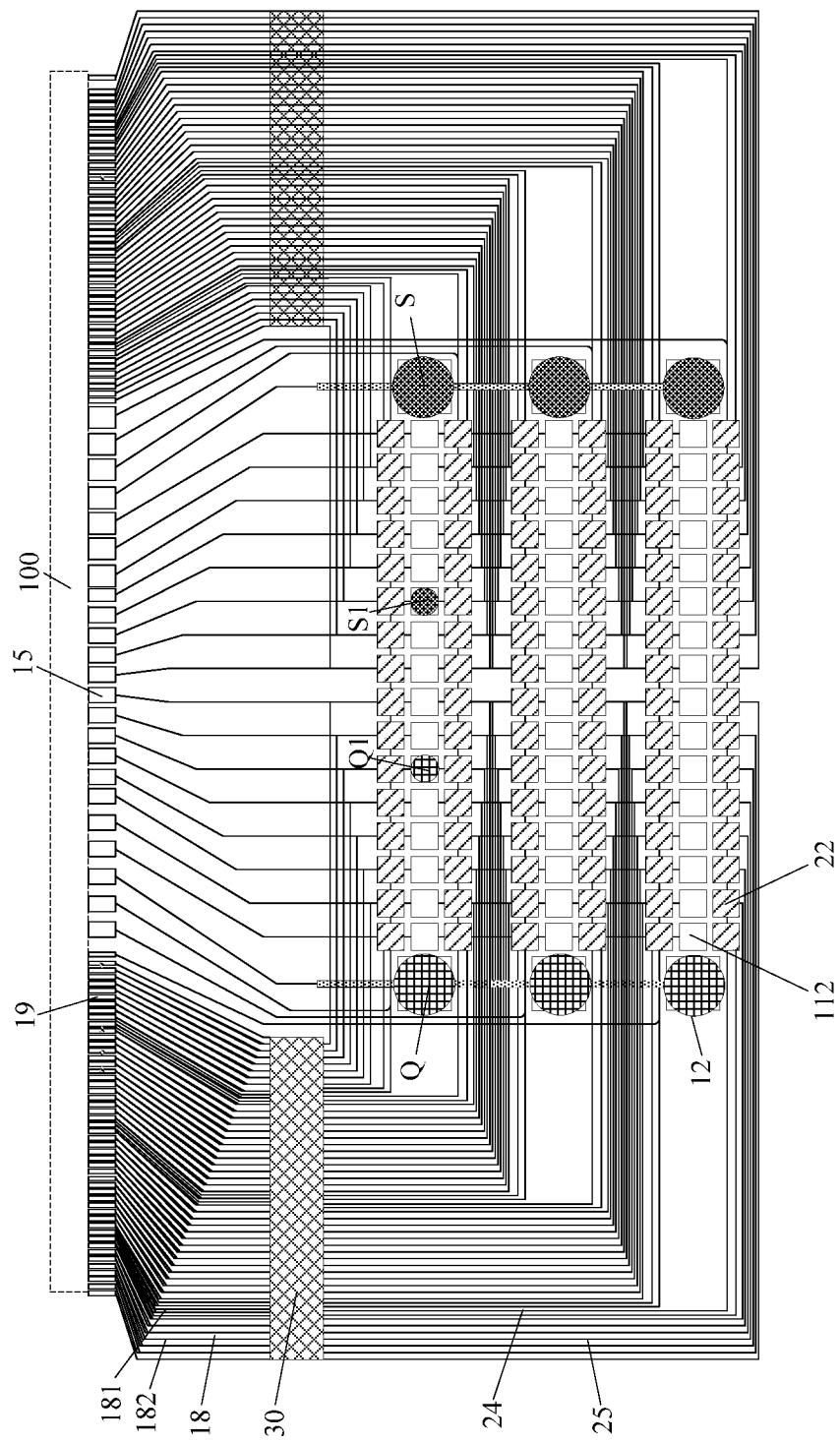
FIG. 4 is a schematic diagram illustrating how droplets move on an electrochemical detection chip according to some embodiments of the present disclosure.

The principle in which the droplet is separated from the reagent on the liquid storage electrode 12 and moves is as follows. As shown in FIG. 4, the liquid to be tested (marked as Q in FIG. 4) and the analytical reagent (marked as S in FIG. 4) are respectively located at areas of the liquid storage electrodes 12 on both sides of a row of second driving electrodes 112 in an initial state. Voltages are applied sequentially to the liquid storage electrode 12 that stores the liquid to be tested and at least some of a near row of second driving electrodes 112, such that a droplet (marked as Q1 in FIG. 4) of the liquid to be tested is separated from the liquid to be tested on the liquid storage electrode 12, and moves to, e.g. a position shown in FIG. 4 along the row direction of the second driving electrodes 112 under the driving force of an electric field. Similarly, voltages are applied sequentially to the liquid storage electrode 12 that stores the analytical reagent and at least some of a near row of second driving electrodes 112, such that a droplet (marked as S1 in FIG. 4) of the analytical reagent is separated from the reagent on the liquid storage electrode 12, and moves to, e.g. a position shown in FIG. 4 along the row direction of the second driving electrodes 112 under the driving force of an electric field. On this basis, one-dimensional continuous driving of droplets is achieved in the row direction.

After the droplet of the liquid to be tested or the droplet of the analytical reagent moves to an area where a second driving electrode 112 is located, a voltage is applied to a first driving electrode 111 that is aligned with the second driving electrode 112 in the column direction, such that the droplet moves upward or downward to an area where the first driving electrode 111 is located. Thus, the droplet of the liquid to be tested and the droplet of the analytical reagent successively move to the area where the first driving electrode 111 is located and contact each other, so as to facilitate subsequent detections. Thus, another one-dimensional continuous driving of droplets in the column direction is achieved. Based on this, two-dimensional driving of droplets in a space formed by engagement of the first substrate 10 and the second substrate is achieved.

In some embodiments, as shown in FIG. 1, the electrochemical detection chip further includes a first signal wiring layer 13 and a first dielectric layer 14 that are disposed on the first substrate 10. The first dielectric layer 14 is disposed on between the first signal wiring layer 13 and the plurality of driving electrodes 11. A plurality of wires in the first signal wiring layer 13 are electrically connected with the plurality of driving electrodes 11 through via holes formed in the first dielectric layer 14 to transmit signals to the driving electrodes.

The first signal wiring layer 13, the plurality of driving electrodes 11 and the at least one liquid storage electrode 12 may be made of conventional conductive materials such as Mo (molybdenum), Al (aluminum), Cu (copper) or ITO (Indium Tin Oxide). The first dielectric layer 14 is made of insulating materials and is used to isolate two adjacent wires in the first signal wiring layer 13.

The first signal wiring layer 13 includes the plurality of wires arranged on the first substrate 10 in a certain wiring manner. The wires are configured to contact the plurality of driving electrodes 11 through via holes formed in the first dielectric layer 14, thereby transmitting signals to the driving electrodes 11 and achieving directional movement of the above droplets in two-dimensional directions in the space between the first substrate 10 and the second substrate 20.

In some embodiments, as shown in FIG. 3, the first signal wiring layer 13 includes at least one first signal wire 131, a plurality of second signal wires 132, and at least one third signal wire 133. Each first signal wire is configured to be electrically connected with a corresponding row of first driving electrodes 111. The plurality of second signal wires 132 are configured to be electrically connected with independent second driving electrodes 112 in a row respectively. Each third signal wire 133 is configured to be electrically connected with a corresponding column of liquid storage electrodes 12.

Here, the movement of the droplet in the space between the first substrate 10 and the second substrate is first a one-dimensional movement along the row direction of the second driving electrodes 112, and then another one-dimensional movement along the column direction formed by the second driving electrode 112 and the aligned first driving electrodes 111. Therefore, the plurality of second signal wires 132 are configured to be electrically connected with independent second driving electrodes 112 in a row respectively, so as to sequentially form an electric driving field between each two adjacent second driving electrodes 112 in the row of second driving electrodes 112. That is, in each row of second driving electrodes 112, each second driving electrode 112 is connected to an independent second signal wire 132, and receives an independent voltage to drive the droplet to move along an extension direction of this row of second driving electrodes 112. There is no need to form electric fields between first driving electrodes 111 in each row of first driving electrodes 111. Therefore, to simplify the wiring complexity, a first signal wire 131 may be configured to be electrically connected with a row of first driving electrodes 111. Similarly, a same third signal wire 133 may be configured to be electrically connected with a column of liquid storage electrodes 12.

Moreover, since droplets move on two adjacent rows of second driving electrodes 112 independently and without interference with each other, in some embodiments, a column of second driving electrodes 112 aligned along the column direction may be electrically connected to a same second signal wire 132 to further simplify the wiring difficulty.

In some embodiments, as shown in FIG. 3, since the wires are closely arranged, the electrochemical detection chip further includes at least one connection electrode 12a disposed on the base substrate 10. The at least one liquid storage electrode 12 includes at least two liquid storage electrodes 12, and each connection electrode 12a is, for example, electrically connected with liquid storage electrodes 12 in the column direction, and extends from a first liquid storage electrode 12 at the beginning or end of the column to electrically connect the third signal wire 133 to receive signals. In some examples, the at least one connection electrode 12a and the at least two liquid storage electrodes 12 are arranged in a same layer, that is, the at least one connection electrode 12a is formed while the liquid storage electrode 12 is prepared.

It is noted that the above structure of the first signal wiring layer 13 is only used as an optional implementation manner. The wiring mode of the wires is not limited herein, as long as the plurality of driving electrodes 11 and the at least one liquid storage electrode 12 can receive corresponding driving signals to drive a droplet to be separated from the liquid on the liquid storage electrode 12 and move to a preset detection site for electrochemical detection.

In some embodiments, as shown in FIG. 3, the electrochemical detection chip further includes a plurality of first bonding electrodes 15 disposed on the first substrate and configured to bond a circuit board 100. Each first signal wire 131, each second signal wire 132 and each third signal wire 133 are coupled to corresponding first bonding electrodes 15 respectively. Here, the area where the plurality of binding electrodes 15 are located is the bonding area, and the circuit board 100 to be bonded, for example, is a Flexible Printed Circuit (FPC) to connect an external circuit, so as to apply signals to the plurality of driving electrodes 11.

In some embodiments, as shown in FIG. 1, the electrochemical detection chip further includes a first hydrophobic layer 16 disposed on a side of the plurality of driving electrodes 11 and the at least one liquid storage electrode 12 facing away from the first substrate 10, and the first hydrophobic layer 16 covers the plurality of driving electrodes 11 and the at least one liquid storage electrode 12. In this way, since the liquid to be tested and the analytical reagent are usually both polar liquids, contact angles of the liquid to be tested and the analytical reagent on a surface of the first hydrophobic layer 16 may be greater than 90 when the liquid to be tested and the analytical reagent are not driven by an electric field, which is more advantageous to drive the droplet of the liquid to be tested and the droplet of the analytical reagent to be discrete in a controller manner after an electric field is applied.

According to the design requirements of the electrochemical detection chip, in some embodiments, the electrochemical detection chip further includes other structural layers disposed between the first hydrophobic layer 16 and the electrode layer including the plurality of driving electrodes 11 and the at least one liquid storage electrode 12, so as to improve the detection effect.

For example, as shown in FIG. 1, the electrochemical detection chip further includes a second dielectric layer 17 disposed between the first hydrophobic layer 16 and the electrode layer including the plurality of driving electrodes 11 and the at least one liquid storage electrode 12, so as to provide a flat substrate for the first hydrophobic layer 16, avoid an influence on the flatness of the first hydrophobic layer 16 due to thickness differences between the driving electrodes 11, the liquid storage electrodes 12 and the first substrate 10, and thereby prevent restriction or diversion of the movement of the droplets.

In some embodiments, as shown in FIG. 2, the electrochemical detection chip further includes a second hydrophobic layer 23 disposed on a side of the second substrate 20 facing toward the first substrate, and an area occupied by the second hydrophobic layer 23 on the second substrate 20 is directly opposite an area of the first hydrophobic layer 16 that covers the plurality of second driving electrodes 112. In this way, contact angles of the liquid to be tested and the analytical reagent on a surface of the second hydrophobic layer 23 may be also greater than 90° when the liquid to be tested and the analytical reagent are not driven by an electric field, which is more advantageous to drive the droplet of the liquid to be tested and the droplet of the analytical reagent to be discrete in a controller manner after an electric field is applied.

In some embodiments, as shown in FIG. 5, patterns of the first detection electrode 21 and the second detection electrode 22 are both comb-shaped, and comb tooth parts 210 of the first detection electrode and comb tooth parts 220 of the second detection electrode are arranged alternatively and are spaced apart from each other. Here, a comb-shaped electrode structure is composed of a strip-shaped part and a plurality of comb tooth parts that extend from a same side of the strip-shaped part and are spaced apart from each other.

In some embodiments, according to a size of a side length of the second driving electrode 112, a width of tooth of the comb tooth parts 210 of the first detection electrode and a width of tooth of the comb tooth parts 220 of the second detection electrode are both, for example, 0.01-1 mm, and a comb tooth part 210 of the first detection electrode and a comb tooth part 220 of the second detection electrode that are adjacent to each other are spaced apart from each other at an interval of, for example, 1-100 μm.

In some embodiments, the electrochemical detection chip further includes a second signal wiring layer disposed on the second substrate 20. Wires in the second signal wiring layer are electrically connected to the first detection electrodes and the second detection electrodes.

Figure 6:
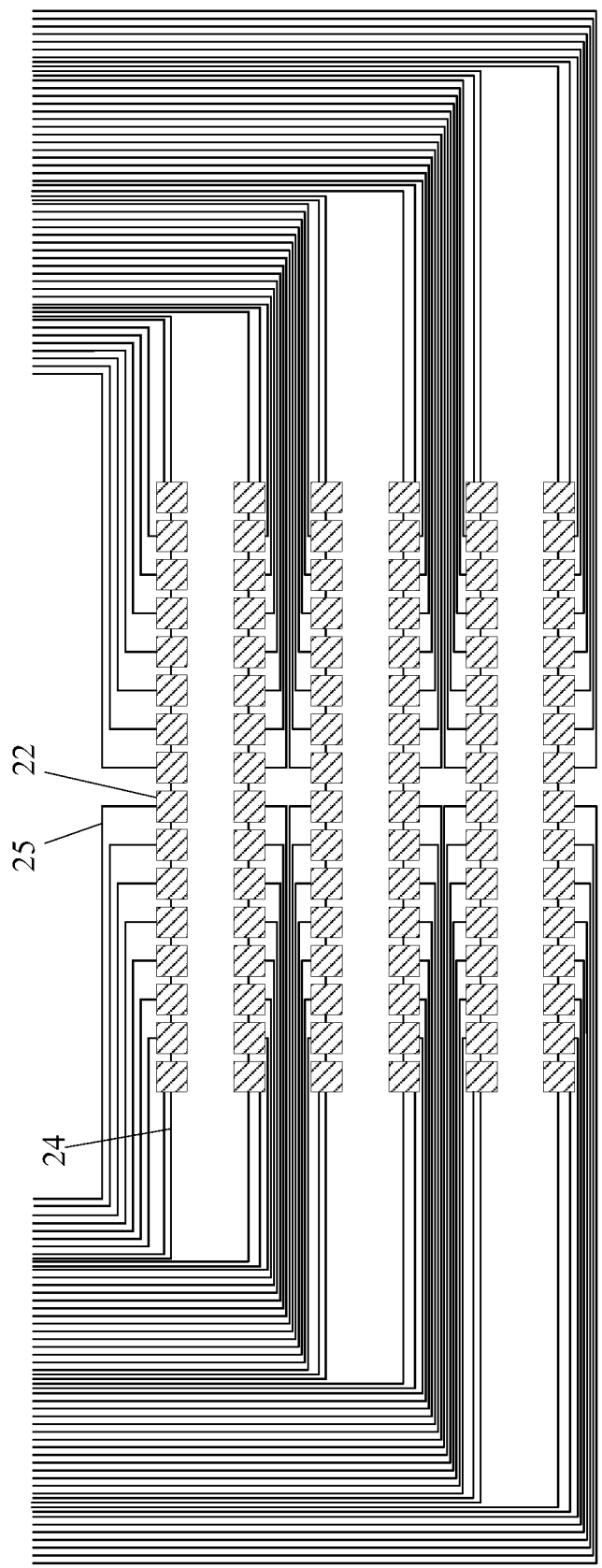
FIG. 6 is a schematic diagram illustrating structures on a second substrate in an electrochemical detection chip according to some embodiments of the present disclosure.

In some embodiments, as shown in FIG. 5, the second signal wiring layer includes at least one fourth signal wire 24 and a plurality of fifth signal wires 25. The at least one fourth signal wire 24 is electrically connected with at least one row of first detection electrodes respectively. As shown in FIG. 6, the plurality of fifth signal wires 25 are electrically connected with independent second detection electrodes 22 respectively.

In order to reduce the difficulty of wiring of the wires on the second substrate, a same fourth signal wire 24 may be electrically connected with a row of first detection electrodes used as counter electrodes, i.e. a same voltage signal is input to a row of first detection electrodes. The second detection electrodes 22 are arranged independently from each other, so different signals need to be applied to the second detection electrodes 22 in a one-to-one correspondence to obtain a difference, i.e., a current change, between currents detected before and after the droplet of the liquid to be tested contact the droplet of the analytical reagent. Hence, each second detection electrode 22 is electrically connected to a different fifth signal wire 25 independently as a working electrode.

Here, since the structure on the second substrate is very simple, the wiring arrangement can be adjusted to avoid crossing between the wires. Therefore, in some embodiments, the detection electrodes and the wires on the second substrate 20 are arranged in a same layer, and composed of a same conductive material (such as gold, platinum, graphite, etc.) with a high sensing sensitivity to simplify a preparation process and reduce a thickness of the electrochemical detection chip.

For simplicity, FIG. 6 merely illustrates an optional wiring manner showing the second detection electrodes 22 and the fifth signal wires 25 extracted respectively from the second detection electrodes 22, which is not limited herein, and the wiring mode of the fifth signal wires 25 may be flexibly configured according to the specific parameters of the size of the electrochemical detection chip.

The configurations of the electrodes and the wires in the above embodiments of the present disclosure will be further explained with reference to FIG. 5. A position of the first substrate 10 where a first driving electrode 111 is disposed is directly opposite a position of the second substrate 20 where a corresponding first detection electrode 21 and a corresponding second detection electrode 22 are disposed. A position of the second substrate 20 that is directly opposite the second driving electrode 112 is not provided with a first detection electrode 21 and a second detection electrode 22. A column of second driving electrodes 112 aligned along the column direction are electrically connected to a same second signal wire 132. A row of first driving electrodes 111 are electrically connected to a same first signal wire 131. A fourth signal wire 24 is electrically connected to a row of first detection electrodes 21. A plurality of fifth signal wires 25 (merely 6 are illustrated in FIG. 5 for simplicity) are electrically connected to independent second detection electrodes 22 in rows respectively.

To simplify the design structure of the second substrate, in some embodiments, as shown in FIG. 3, the electrochemical detection chip further includes a plurality of second bonding electrodes 19, at least one fourth signal wire connecting line 181, and a plurality of fifth signal wire connecting lines 182, which are disposed on the first substrate. The plurality of second bonding electrodes 19 are configured to bond a circuit board, and each of the fourth signal wire connecting lines 181 and each of the fifth signal wire connecting lines 182 are respectively configured to be connected to corresponding second bonding electrodes 19. As shown in FIG. 3, an area where the fourth signal wire connecting lines 181 and the fifth signal wire connecting lines 182 are located is marked as 18.

The plurality of first bonding electrodes 15 and the plurality of second bonding electrodes 19 can configured to bond a same circuit board or different circuit boards, which is not limited herein. In some embodiments, as shown in FIGS. 3, 4 and 7, the plurality of first bonding electrodes 15 and the plurality of second bonding electrodes 19 are configured to bond the same circuit board 100.

Figure 7:
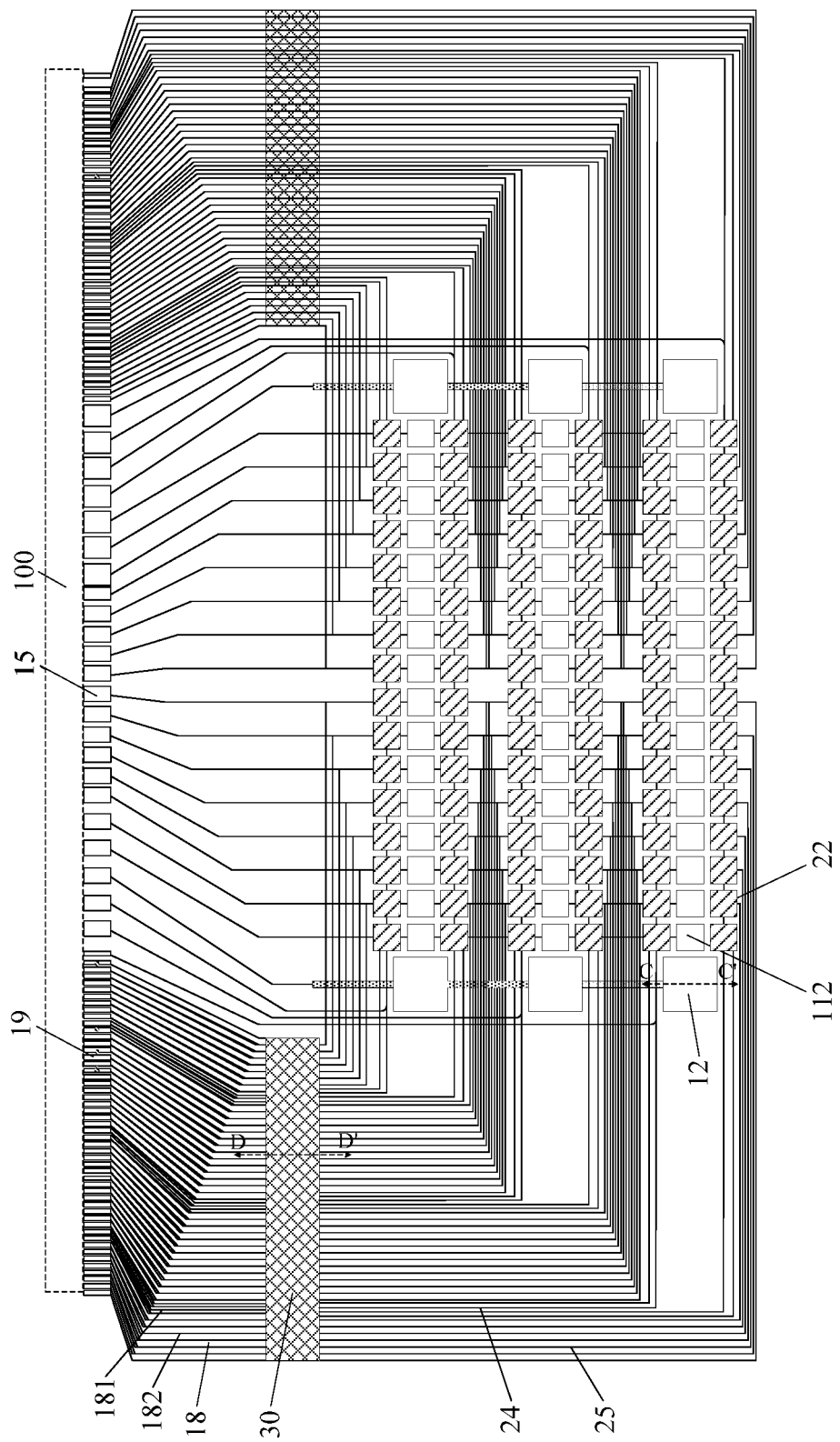
FIG. 7 is a schematic diagram illustrating an overall structure obtained after a first substrate in an electrochemical detection chip is assembled with a second substrate therein according to some embodiments of the present disclosure.
Figure 9:
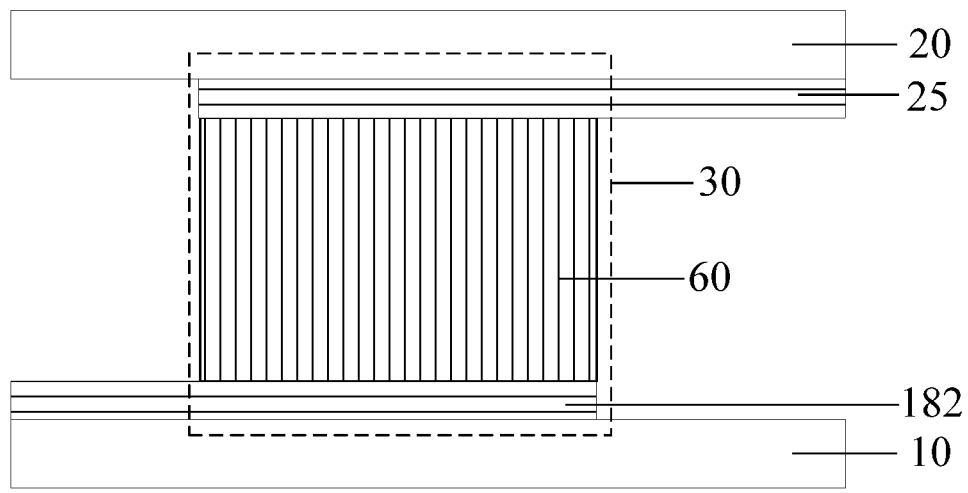
FIG. 9 is a schematic diagram illustrating a sectional structure in a direction D-D' of an overall structure obtained after a first substrate in an electrochemical detection chip is assembled with a second substrate therein shown in FIG. 7.

As shown FIGS. 7 and 9, the electrochemical detection chip further includes electric connection structures 60 disposed in a connection region 30. The first substrate 10 and the second substrate 20 are assembled together via the electric connection structures 60. Thus, the at least one fourth signal wire 24 on the second substrate 20 are electrically connected to the at least one fourth signal wire connecting line 181 on the first substrate 10 in a one-to-one correspondence manner, and the plurality of fifth signal wires 25 on the second substrate 20 are electrically connected to the plurality of fourth signal wire connecting lines 182 on the first substrate 10 in a one-to-one correspondence manner.

In some embodiments, as shown in FIG. 9, the electrical connection structures 60 are conductive adhesives. Connection via conductive adhesives features simple operations.

Thus, wires on the upper and lower substrates are assembled together via the conductive adhesives, and corresponding detection signals are transmitted to the first detection electrodes 21 and the second detection electrodes 22 on the second substrate to perform biological detections. A material of the conductive adhesive may be an encapsulated adhesive with conductive gold balls dispersed inside.

Figure 8:
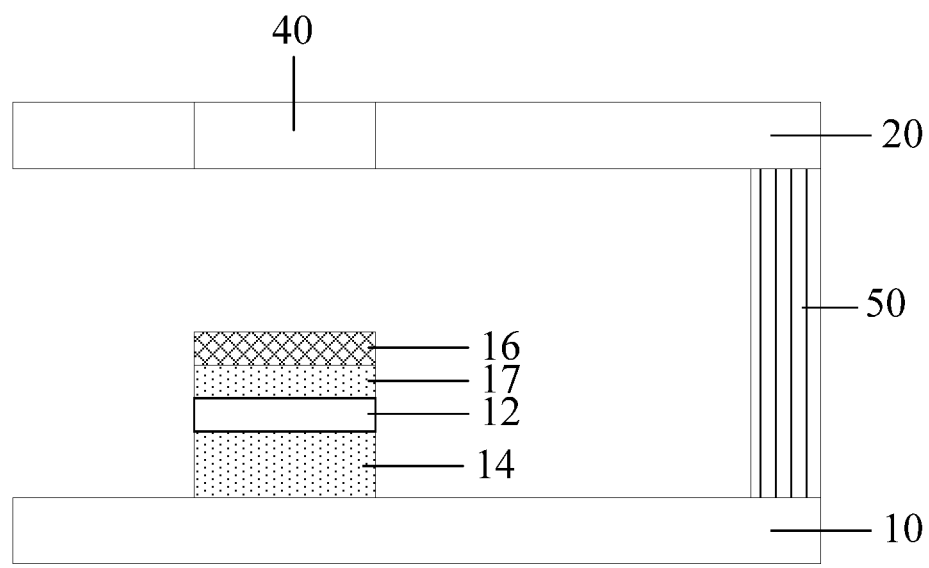
FIG. 8 is a schematic diagram illustrating a sectional structure in a direction C-C' of an overall structure obtained after a first substrate in an electrochemical detection chip is assembled with a second substrate therein shown in FIG. 7.

In some embodiments, as shown in FIG. 8, the electrochemical detection chip further includes at least one drip hole 40 passing through the second substrate 20 to expose at least one area of the first hydrophobic layer 16 that covers the at least one liquid storage electrode 12, so as to drip the liquid to be tested or the analytical reagent to the at least one liquid storage electrode 14.

In some embodiments, as shown in FIG. 8, the electrochemical detection chip further includes a support 50 disposed between the first substrate 10 and the second substrate 20, such that there is a space for the droplets to move after the two substrates are assembled together.

Some embodiments of the present disclosure provide a detection method of the above-described electrochemical detection chip, and the detection method includes steps 1 and 2 (S1 and S2).

In S1, driving signals are applied to at least some of the driving electrodes respectively, such that a droplet of the liquid to be tested and a droplet of the analytical reagent move to a detection position.

In S2, detection signals are applied to a first detection electrode and a second detection electrode at the detection position respectively to detect whether there is a current change before and after the droplet of the liquid to be tested contacts the droplet of the analytical reagent, so as to determine whether a target analyte exists in the liquid to be tested.

In the detection method of the electrochemical detection chip provided in the embodiments of the present disclosure, driving signals are applied to the driving electrodes respectively to drive droplets to be separated from the liquids on the liquid storage electrodes respectively and move to detection positions respectively. Then biological detection can be performed by applying detection signals to the detection electrodes that form pairs through intersection. This method saves drip time. Since the volume of the droplets is merely at a level of microlitre, this method also saves reagents and costs.

In the above description of embodiments, the specific features, structures, materials or characteristics can be combined in a suitable manner in any one or more embodiments or samples.

The above embodiments are merely some embodiments of the present disclosure, but the protection scope of the present disclosure is not limited thereto. Any person skilled in the art could readily conceive of changes or replacement within the technical scope of the present disclosure, which shall all be included in the protection scope of the present disclosure. Therefore, the protection scope of the disclosure shall be determined by the protection scope of the claims.

What is claimed is:

1. An electrochemical detection chip, comprising:
    a first substrate and a second substrate that are opposite to each other;
    a plurality of driving electrodes arranged on a side of the first substrate facing toward the second substrate, the plurality of driving electrode being arranged independently;
    first detection electrodes and second detection electrodes respectively arranged at a plurality of positions on a side of the second substrate facing toward the first substrate that are directly opposite at least a part of the plurality of driving electrodes, wherein the first detection electrodes and the second detection electrodes are spaced apart from each other;
    the electrochemical detection chip further comprises a second signal wiring layer disposed on the second substrate, wherein
    wires of the second signal wiring layer are configured to be electrically connected to the first detection electrodes and the second detection electrodes;
    the wires of the second signal wiring layer include at least one fourth signal wire and a plurality of fifth signal wires;
    the at least one fourth signal wire is configured to be electrically connected to at least one row of first detection electrodes respectively; and
    the plurality of fifth signal wires are configured to be electrically connected to the second detection electrodes respectively.

2. The electrochemical detection chip according to claim 1, wherein the plurality of driving electrodes include a plurality of first driving electrodes and a plurality of second driving electrodes:
    each first driving electrode is configured to be directly opposite a corresponding first detection electrode and a corresponding second detection electrode; positions of the second substrate that are directly opposite the plurality of second driving electrodes are not provided with a first detection electrode and a second detection electrode;
    wherein the plurality of second driving electrodes are arranged in at least one row along a row direction, and the plurality of first driving electrodes are arranged in at least one row along the row direction; at least one row of first driving electrodes is correspondingly disposed on at least one side of each row of second driving electrodes along a column direction, and first driving electrodes in each row of first driving electrodes are aligned with second driving electrodes in a corresponding row of second driving electrodes in the column direction in a one-to-one correspondence manner.

3. The electrochemical detection chip according to claim 2, further comprising at least one liquid storage electrode disposed on the first substrate; wherein each of the at least one liquid storage electrode is located near a beginning or end of a corresponding row of second driving electrodes.

4. The electrochemical detection chip according to claim 3, wherein an area of one of the at least one liquid storage electrode is greater than an area of one of the plurality of driving electrodes.

5. The electrochemical detection chip according to claim 3, further comprising:
    a first signal wiring layer disposed on the first substrate, and
    a first dielectric layer disposed between the first signal wiring layer and the plurality of driving electrodes, wherein
    the first signal wiring layer includes a plurality of wires, and the plurality of wires are electrically connected with the plurality of driving electrodes through via holes formed in the first dielectric layer.

6. The electrochemical detection chip according to claim 3, further comprising a first hydrophobic layer disposed on a side of the plurality of driving electrodes and the at least one liquid storage electrode facing away from the first substrate, wherein
    the first hydrophobic layer covers the plurality of driving electrodes and the at least one liquid storage electrode.

7. The electrochemical detection chip according to claim 5, wherein the plurality of wires include at least one first signal wire, a plurality of second signal wires, and at least one third signal wire;
    the at least one first signal wire is configured to be electrically connected to at least one row of first driving electrodes respectively;
    the plurality of second signal wires are configured to be electrically connected to second driving electrodes in a row respectively;

the at least one third signal wire is configured to be electrically connected to at least one column of liquid storage electrodes respectively.

8. The electrochemical detection chip according to claim 7, further comprising a plurality of first bonding electrodes disposed on the first substrate, wherein the plurality of first bonding electrodes are configured to bond a circuit board, each first signal wire, each second signal wire and each third signal wire are coupled to corresponding first bonding electrodes respectively.

9. The electrochemical detection chip according to claim 6, further comprising a second hydrophobic layer disposed on a side of the second substrate facing toward the first substrate, wherein
an area occupied by the second hydrophobic layer on the second substrate is directly opposite an area of the first hydrophobic layer that covers the second driving electrodes.

10. The electrochemical detection chip according to claim 6, further comprising at least one drip hole passing through the second substrate, to respectively expose at least one area of the first hydrophobic layer that covers the at least one liquid storage electrode.

11. The electrochemical detection chip according to claim 1, wherein patterns of each first detection electrode and a corresponding second detection electrode are both comb-shaped, and comb tooth parts of the first detection electrode and comb tooth parts of the second detection electrode are arranged alternatively and are spaced apart from each other.

12. The electrochemical detection chip according to claim 1, further comprising a plurality of second bonding electrodes, at least one fourth signal wire connecting line, and a plurality of fifth signal wire connecting lines, which are all disposed on the first substrate, wherein
the plurality of second bonding electrodes are configured to bond a circuit board;
each fourth signal wire connecting line and each fifth signal wire connecting line are configured to be connected to corresponding second bonding electrodes respectively;
the electrochemical detection chip further includes electrical connection structures arranged between the first substrate and the second substrate; the electrical connection structures are configured to electrically connect the at least one fourth signal wire with the at least one fourth signal wire connecting line in a one-to-one correspondence manner, and electrically connect the plurality of fifth signal wires with the plurality of fifth signal wire connecting lines in a one-to-one correspondence manner.

13. The electrochemical detection chip according to claim 12, wherein the electrical connection structures are each a conductive adhesive.

14. The electrochemical detection chip according to claim 1, farther comprising a support disposed between the first substrate and the second substrate.

15. A detection method of the electrochemical detection chip according to claim 1, the detection method comprising:
applying driving signals to at least some of the plurality of driving electrodes respectively, such that a droplet of a liquid to be tested and a droplet of an analytical reagent move to a detection position; and
applying detection signals to one of the first detection electrodes and one of the second detection electrodes at the detection position respectively to detect whether there is a current change before and after the droplet of the liquid to be tested contacts the droplet of the analytical reagent.

* * * * *